United States Patent [19]
Straley et al.

[11] 3,890,307
[45] June 17, 1975

[54] PROCESS FOR THE PRODUCTION OF METHINE DYES

[75] Inventors: James M. Straley; Gary T. Clark, both of Kingsport, Tenn.

[73] Assignee: Eastman Kodak Company, Rochester, N.Y.

[22] Filed: Apr. 2, 1973

[21] Appl. No.: 347,024

[52] U.S. Cl............ 260/240 E; 8/177 AB; 8/177 R; 8/178; 8/179
[51] Int. Cl...................... C09b 23/10; C09b 23/14
[58] Field of Search........... 260/240 E, 240.9, 240.1

[56] References Cited
UNITED STATES PATENTS

| | | | |
|---|---|---|---|
| 2,242,474 | 5/1941 | Kochendoerfer et al. | 260/240.9 |
| 2,350,393 | 6/1944 | Eistert et al. | 260/240.9 |
| 2,734,901 | 2/1956 | Belcher | 260/240.9 |
| 3,346,571 | 10/1967 | Spatz et al. | 260/240 E |
| 3,514,453 | 5/1970 | Spatz et al. | 260/240 E |

FOREIGN PATENTS OR APPLICATIONS

| | | | |
|---|---|---|---|
| 869,794 | 7/1961 | United Kingdom | 260/240 E |

OTHER PUBLICATIONS

Plancher, Ber. Deut. Chem. vol. 31, pp. 1488 to 1499 (1898).

Illy et al., J. Org. Chem. vol. 33, pages 4283 to 4285 (1968).

Elderfield, Heterocyclic Compounds, vol. 33, pages 80 to 90, John Wiley and Sons, Inc. N.Y. (1952).

*Primary Examiner*—John D. Randolph
*Attorney, Agent, or Firm*—Elliott Stern; Daniel B. Reece, III

[57] ABSTRACT

This invention is concerned with a process for the production of methine dyes which comprises heating equimolar amounts of a 1-alkyl or phenyl substituted 1-phenylhydrazine and a ketone, subsequently adding to the reaction mixture an equimolar amount of a dialkyl aminoarylaldehyde or indole carboxaldehyde, heating the reaction mixture, and recovering said methine dyestuff.

3 Claims, No Drawings

PROCESS FOR THE PRODUCTION OF METHINE DYES

This invention relates to a novel process for the preparation of methine dyes, and more particularly to a simple one-pot process in which the dyes are obtained in a relatively pure form and in high yield.

At present methine dye syntheses are conducted by condensing a Fischer's base intermediate such as trialkyl-2-methyleneindoline with a suitable aldehyde such as a dialkyl aminoarylaldehyde or indole carboxaldehyde under various conditions. See, for example, U.S. Pat. Nos. 3,379,723, 2,734,901, 2,179,895, 2,242,474 and 3,394,130. These prior art methods for preparing dyestuffs of the type to which the present invention relates are accompanied by serious disadvantages in that the Fischer's base intermediates are quite expensive and subject to autooxidation when exposed to the atmosphere, resulting in colored contamination of the equipment.

It is therefore an object of the present invention to prepare methine dyestuffs of the type mentioned above by a simple one-pot process. It is a further object of the invention to prepare such dyes inexpensively and to isolate high yields of the dye without the use of Fischer's bases as an intermediate. Other objects of the invention will become apparent from the following description and claims.

According to this invention, it has been found that methine dyestuffs having the formula

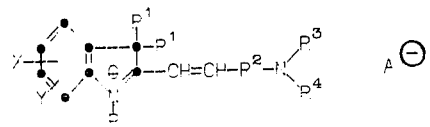

may be prepared by the steps of
1. heating equimolar amounts of
   a. a phenylhydrazine having the formula

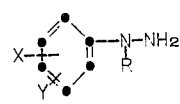

and
   b. a ketone having the formula

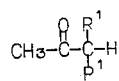

in the presence of an acidic solvent, said solvent containing at least one molar equivalent of acid per mole of phenylhydrazine, at a temperature from about 50°–180°C. for at least an hour;
2. subsequently adding to the reaction solution an equimolar amount of an aldehyde having the formula

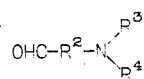

3. heating the reaction solution for at least 2 hours at a temperature from about 50°–180°C.; and
4. recovering said methine dyestuff;

wherein
R is lower alkyl or phenyl, e.g., methyl, ethyl, butyl, pentyl, etc.;
$R^1$ is lower alkyl, e.g., methyl, ethyl, butyl, etc.;
X and Y are the same or different and each is hydrogen, halo, nitro, lower alkoxy, lower alkyl or lower alkoxycarbonyl, e.g., chloro, bromo, iodo, methoxy, butoxy, propoxy, methyl, ethyl; pentyl, methoxycarbonyl, butoxycarbonyl, etc.;
$R^2$ is phenylene, phenylene substituted with lower alkyl, halo or lower alkoxy; naphthylene or naphthylene substituted with lower alkyl, halo or lower alkoxy, e.g., p-phenylene, m-tolylene, o-tolylene, chloro-p-phenylene, dimethoxy-p-phenylene, dichloro-p-phenylene, ethoxy-p-phenylene, napthylene substituted with methyl, ethyl, butyl, chloro; bromo, methoxy, ethoxy, etc.;
$R^3$ and $R^4$ are the same or different and each is hydrogen, lower alkyl, phenyl, lower alkyl substituted with halo, hydroxy, cyano, lower alkoxy, acetoxy, succinimido or phthalimido; or $R^3$ and $R^4$ together with the nitrogen atom to which they are bonded may represent

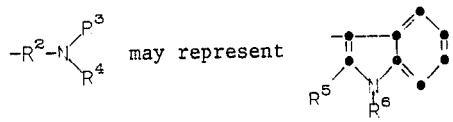

wherein
$R^5$ is lower alkyl or phenyl;
$R^6$ is hydrogen, lower alkyl, benzyl or phenyl; and
A⁻ is a basic dye anion.

As used herein to describe a substituent containing an alkyl moiety the word "lower" designates a carbon content of up to about 6 carbon atoms.

In a preferred embodiment of this invention R is methyl or ethyl; $R^1$ is methyl; X and Y are hydrogen, lower alkyl or lower alkoxycarbonyl; $R^2$ is phenylene or phenylene substituted with lower alkyl; $R^3$ and $R^4$ represent hydrogen, lower alkyl or lower alkyl substituted with halo, succinimido or cyano, or

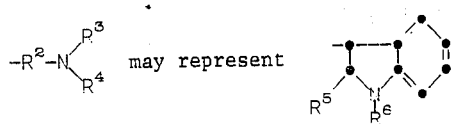

wherein $R^5$ is methyl or phenyl; $R^6$ is hydrogen or lower alkyl; and A⊖ is a basic dye anion such as

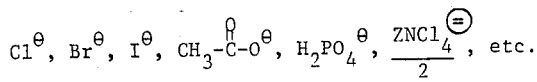

The anion does not affect the utility of the methine cations of the process of the invention as dyes nor does it affect the dye affinity of the cation for certain textile fibers such as polyacrylonitrile or other anionicallymodified textile materials. When the compounds prepared by the novel process of this invention are used to dye polyacrylonitrile textile material, for example, the anion of the dye becomes associated with a cation derived from the polyacrylonitrile and is removed from the polyacrylonitrile textile material, either in the dyebath or in a subsequent washing of the dyed polyacrylonitrile textile material.

A wide variety of phenylhydrazines may be utilized in the process of this invention, the only requirement being that the 1-nitrogen be substituted with either a lower alkyl group or a phenyl group. These compounds are well known in the art and can either be purchased commercially or prepared by well-known methods. See, for example, Rodd, E. H., *Chemistry of Carbon Compounds*, Elsevier Publishing Co., New York, Vol. III, Part A, pp. 345–6, 358–60. Examples of such suitable phenylhydrazines are 1-methyl-1-phenylhydrazine, 1-methyl-1-(4-nitro)phenylhydrazine, 1-ethyl-1-phenylhydrazine, 1,1-diphenylhydrazine, 1-butyl-1-(4-ethyl)phenylhydrazine, 1-methyl-1-(2-methoxy-4-methoxycarbonyl)phenylhydrazine, etc.

Examples of ketones which may be utilized in the process of this invention are 3-methyl-2-butanone, 3-methyl-2-pentanone, 3-ethyl-2-pentanone, 3-methyl-2-heptanone, etc. These compounds are well known in the art and can either be purchased commercially or prepared by well-known methods. See, for example, Noller, C. R., *Chemistry of Organic Compounds*, Third Edition, W. B. Saunders Co., Philadelphia, Pa., 1966, pp. 193–194.

A wide variety of dialkyl aminoarylaldehydes or indole carboxaldehydes may be used in the process of this invention. These compounds are well known in the art to be useful in the production of methine dyestuffs. See, for example, U.S. Pat. Nos. 3,379,723, 2,734,901, 2,179,895, 2,242,474 and 3,394,130.

Examples of suitable dialkyl aminoarylaldehydes and indole carboxaldehydes are 4-acetamidobenzaldehyde, 4-N,N-diethylaminobenzaldehyde, 4-(N-$\beta$-cyanoethyl-N-methyl)aminobenzaldehyde, 4-(N-cyclohexyl-N-propyl)aminobenzaldehyde, 4-(N-$\beta$-cyanoethyl-N-methyl)aminobenzaldehyde, 4-(N-$\beta$-chloroethyl-N-cyanoethyl)aminobenzaldehyde, 4-(N-$\beta$-chloroethyl-N-methyl)aminobenzaldehyde, 4-(N-phenyl-N-methyl)aminobenzaldehyde, 4-(N-morpholino)benzaldehyde, 1,2-dimethylindole-3-carboxaldehyde, 2-methylindole-3-carboxaldehyde, 1-methylindole-3-carboxaldehyde, 1-methyl-2-phenylindole-3-carboxaldehyde, 4-(N-$\beta$-succinimidoethyl-N-$\beta$-cyanoethylamino)-o-tolualdehyde, 4-(N-$\beta$-succinimidoethylamino-N-ethyl)benzaldehyde 4-(N,N-di-$\beta$-phthalimidoethylamino)-o-tolualdehyde, 4-(N,N-dimethylamino)-1-naphthaldehyde, etc.

The condensation of the phenylhydrazine, ketone and aldehyde components by the process of this invention is carried out in the presence of an acid catalyst or condensing agent, e.g., acetic acid, formic acid, propionic acid, hydrochloric acid, sulfuric acid, phosphoric acid, or mixtures of acids, and generally substances having a pK value of at least $10^{-6}$. Preferably the acid utilized is glacial acetic acid. These acids are present in at least equimolar amounts compared with the amount of phenylhydrazine present but an excess is operable although unnecessary. Lesser amounts of acid tend to decrease the reaction rate, while more than 10 times the molar equivalent quantity has no greater effect on the reaction velocity. The preferred ratio is from 1 mole to 6 moles of acid equivalent per 1 mole of phenylhydrazine intermediate.

The condensation may be carried out in the presence of a water-soluble alcohol or ether, containing 5% to 40% by weight of water. The solvent and amount used is not critical, the only requirement being that enough should be present to dissolve the reactants, and solvent should be nonreactive with the reactants. Any four carbon atom aliphatic monohydric alcohol, such as methanol, ethanol, propanol, and isopropanol is satisfactory provided it forms clear solutions with from 5 to 40% by weight of water. Ethers such as dioxane, 1,2-dimethoxyethane, and the monomethyl or monoethyl ether of ethylene glycol also can be used either alone or in admixture with one or more of the above solvents. Moreover, the acid catalysts, condensing agents themselves, can function dually as catalysts and as solvents.

The temperature at which the novel process of this invention is carried out can be varied over a broad range. The reaction temperature is not a critical feature of the process but serves, within limits, to expedite the condensation and thus to obtain a convenient reaction period. Accordingly, temperatures from about 50°C. to about 180°C. are generally preferred. Reactions carried out below about 50°C. require inordinately long periods for completion, whereas at temperatures much above 180°C. decomposition and side reactions may become prominent and thus detract from the yield of the desired product.

The process may be carried out in the presence of air and at atmospheric conditions. It is preferred, however, that a blanket of an inert gas such as nitrogen or helium be utilized. Generally, the entire reaction can be carried out in from 2 to about 8 hours after which the reaction solution is poured into water and the resulting dye is precipitated by the addition of salt, the anion of which corresponds to the desired basic dye anion which is to be associated with the methine dyestuff being prepared. Examples of suitable salts are sodium chloride, sodium bromide, sodium iodide, potassium chloride, potassium iodide, potassium bromide, zinc chloride, zinc sulfate, sodium phosphate or sodium sulfate.

In a preferred embodiment of this process the phenylhydrazine and ketone are heated in acetic acid at 90°–95°C. for about 2 hours. The aldehyde is then added with the aid of some acetic acid, and the reaction mixture is heated at 90°–95°C. for an additional 2 hours. The solution thus formed is poured into water and the resulting dye is precipitated by the addition of an acid salt and then recovered.

The resulting dyes can be dyed from an acidic bath on acrylic, modacrylic, acid-modified polyester, and acid-modified polyamide textile fibers.

The following examples are included for a better understanding of this invention.

EXAMPLE 1

A solution of 0.61 g. (0.005 mole) of 1-methyl-1-phenylhydrazine and 0.43 g. (0.005 mole) of 3-methyl-2-butanone in 10 ml. of acetic acid is heated on a steam bath for 4 hours under a blanket of nitrogen. A solution of 1.17 g. (0.005 mole) of 1-methyl-2-phenylindole-3-carboxaldehyde in 5 ml. of acetic acid is added and the solution is heated an additional 4 hours. The solution is poured into ice/water and some KI is added. The resulting dye is collected by filtration, washed with 10% sodium chloride solution, and air-dried to yield 1.93 g. (77%) of the following dye.

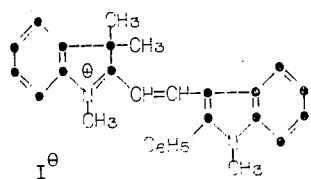

EXAMPLE 2

A solution of 1.22 g. (0.01 mole) of 1-methyl-1-phenylhydrazine and 0.86 g. (0.01 mole) of 3-methyl-2-butanone in 10 ml. of 1 part propionic acid and 5 parts acetic acid is stirred at room temperature under nitrogen for 6 hours. A solution of 2.36 g. (0.01 mole) of p-[N-(2-chloroethyl)-N-(2-cyanoethyl)amino]benzaldehyde in 10 ml. of acetic acid is added and the resulting solution is stirred at room temperature for 4 hours. The solution is poured into ice/water and KI is added to the solution. The dye is collected by filtration, washed with 10% sodium chloride solution, and air-dried to yield 4.27 g. (96%) of the following dye.

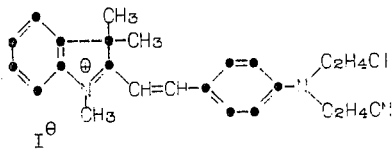

EXAMPLE 3

A solution of 1.22 g. (0.01 mole) of 1-methyl-1-phenylhydrazine and 0.86 g. (0.01 mole) of 3-methyl-2-butanone in 10 ml. of acetic acid is heated at reflux for 2 hours under nitrogen. A solution of 3.13 g. (0.01 mole) p-[N-(2-cyanoethyl)-N-(2-succinimidoethyl)amino]-o-tolualdehyde in 10 ml. of acetic acid is added and the solution is heated an additional hour at reflux. The solution is poured into ice/water and then 1.36 g. (0.01 mole) of zinc chloride is added. The dye precipitates upon the addition of sodium chloride. The dye is collected by filtration, washed with 10% sodium chloride solution, and air-dried to yield 5.5 g. (97%) of the following dye.

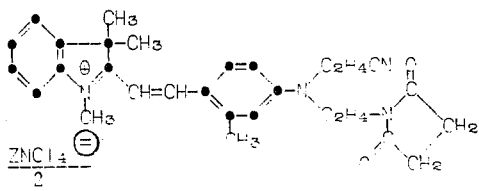

EXAMPLE 4

A solution of 3.4 g. (0.025 mole) of 1-ethyl-1-phenylhydrazine and 2.5 g. (0.025 mole) of 3-methyl-2-pentanone and 8.2 g. (0.025 mole) of 30% aqueous sulfuric acid solution in 35 ml. of isopropyl alcohol is heated at reflux for 3.5 hours under a blanket of nitrogen. 5.9 g. (0.025 mole) of p-[N-(2-chloroethyl)-N-(2-cyanoethyl)amino]benzaldehyde and 35 ml. of isopropyl alcohol is added to the reaction mixture. The reaction mixture is heated at reflux for 2.75 hours, cooled and poured into ice/water containing zinc sulfate. The resulting dye is collected by filtration, washed with 10% aqueous sodium chloride solution and air dried to yield 12.4 g. (93%) of the following dye

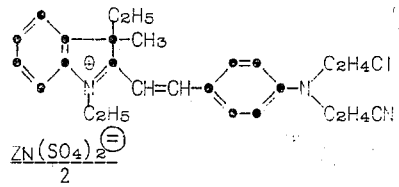

Although the invention has been described in considerable detail with particular reference to certain preferred embodiments thereof, variations and modifications can be effected within the spirit and scope of the invention.

We claim:
1. Process for the preparation of methine dyestuffs having the formula

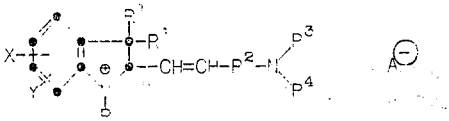

which comprises the steps of
1. heating equimolar amounts of
   a. a phenylhydrazine having the formula

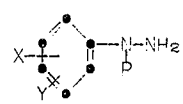

and
   b. a ketone having the formula

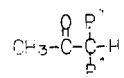

in the presence of an acidic solvent containing at least one molar equivalent of acid per mole of phenylhydrazine at a temperature from about 50°–180°C. for at least an hour;
2. subsequently adding to the solution an equimolar amount of an aldehyde having the formula

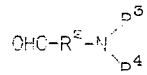

3. heating the reaction mixture for at least 2 hours at a temperature from about 50°–180°C.; and
4. recovering said methine dyestuff;
wherein
R is lower alkyl or phenyl;
$R^1$ is lower alkyl;

X and Y are the same or different and each is hydrogen, halo, nitro, lower alkoxy, lower alkyl or lower alkoxycarbonyl;

$R^2$ is phenylene, phenylene substituted with lower alkyl, halo or lower alkoxy; naphthylene or naphthylene substituted with lower alkyl, halo or lower alkoxy;

$R^3$ and $R^4$ are the same or different and each is hydrogen, lower alkyl, phenyl, lower alkyl substituted with halo, hydroxy, cyano, lower alkoxy, acetoxy, succinimido or phthalimido; or $R^3$ and $R^4$ together with the nitrogen atom to which they are bonded may represent

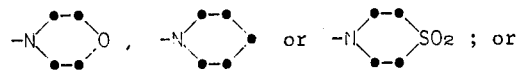

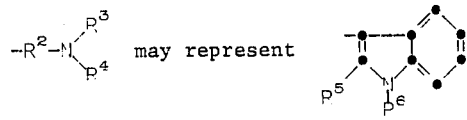

wherein $R^5$ is lower alkyl or phenyl;

$R^6$ is hydrogen, lower alkyl, benzyl or phenyl; and $A^-$ is a basic dye anion.

2. The process according to claim 1 wherein

R is methyl or ethyl;

$R^1$ is methyl;

X and Y are hydrogen, lower alkyl or lower alkoxycarbonyl;

$R^2$ is phenylene or phenylene substituted with lower alkyl;

$R^3$ and $R^4$ are hydrogen, lower alkyl or alkyl substituted with halo, hydroxy or cyano;

$R^5$ is methyl;

$R^6$ is hydrogen or lower alkyl;

$A^-$ is a basic dye anion.

3. Process of claim 2 wherein the phenylhydrazine and ketone are heated in the presence of at least one aliphatic monocarboxylic acid solvent selected from acetic acid, formic acid and propionic acid or admixtures thereof under nitrogen at a temperature of about 90°–95°C. for at least 2 hours, subsequently adding to the reaction mixture the aldehyde dissolved in at least one aliphatic monocarboxylic acid solvent, heating the reaction mixture for at least 2 hours at a temperature of from about 90°–95°C., pouring the reaction mixture into water and salting out said methine dyestuffs by the addition of an inorganic acid salt.

* * * * *